United States Patent
Müller et al.

(10) Patent No.: US 9,920,677 B2
(45) Date of Patent: Mar. 20, 2018

(54) METHOD FOR PRODUCING A DELIVERY MODULE FOR INSTALLATION INTO A TANK

(71) Applicant: EMITEC GESELLSCHAFT FÜR EMISSIONSTECHNOLOGIE MBH, Lohmar (DE)

(72) Inventors: Wilfried Müller, Lindlar (DE); Egbert Zienicke, Lohmar (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/910,923

(22) PCT Filed: Jul. 14, 2014

(86) PCT No.: PCT/EP2014/065006
§ 371 (c)(1),
(2) Date: Feb. 8, 2016

(87) PCT Pub. No.: WO2015/018604
PCT Pub. Date: Feb. 12, 2015

(65) Prior Publication Data
US 2016/0186633 A1    Jun. 30, 2016

(30) Foreign Application Priority Data
Aug. 7, 2013 (DE) .......... 10 2013 108 501

(51) Int. Cl.
*F01N 3/28* (2006.01)
*H01C 17/06* (2006.01)
(Continued)

(52) U.S. Cl.
CPC .......... *F01N 3/2896* (2013.01); *F01N 3/2066* (2013.01); *H01C 17/06* (2013.01);
(Continued)

(58) Field of Classification Search
CPC .. F01N 3/2066; F01N 3/2896; F01N 2610/02; F01N 2610/10; F01N 2610/1406; H01C 17/06; H05B 3/06; Y02T 10/24
See application file for complete search history.

(56) References Cited

U.S. PATENT DOCUMENTS

| | | | |
|---|---|---|---|
| 6,055,360 A * | 4/2000 | Inoue | B60H 1/00321 165/151 |
| 6,358,487 B1 * | 3/2002 | Omae | C09C 1/50 423/450 |

(Continued)

FOREIGN PATENT DOCUMENTS

| | | |
|---|---|---|
| CN | 101238275 | 8/2008 |
| CN | 102822467 | 12/2012 |

(Continued)

*Primary Examiner* — Brandon Lee
(74) *Attorney, Agent, or Firm* — Cozen O'Connor

(57) ABSTRACT

A method for producing a delivery module having an electric PTC heater, for installation into a tank for storing a liquid additive, includes: a) fixing a maximum electrical power that is made available to the delivery module; b) determining a thermal conductivity of the delivery module from a location of the electric PTC heater into the tank; c) calculating a switching temperature of the PTC heater based on the maximum electrical power and the thermal conductivity; and d) mounting a PTC material with a corresponding switching temperature for the PTC heater at the location.

8 Claims, 3 Drawing Sheets

(51) Int. Cl.
  *H05B 3/06* (2006.01)
  *F01N 3/20* (2006.01)
(52) U.S. Cl.
  CPC ............ *H05B 3/06* (2013.01); *F01N 2610/02* (2013.01); *F01N 2610/10* (2013.01); *F01N 2610/1406* (2013.01); *Y02T 10/24* (2013.01)

(56) References Cited

U.S. PATENT DOCUMENTS

| | | |
|---|---|---|
| 8,955,311 B2 | 2/2015 | Brueck et al. |
| 8,991,158 B2 * | 3/2015 | Brueck ................. F01N 3/2066 60/286 |
| 9,032,712 B2 | 5/2015 | Hodgson et al. |
| 2009/0078692 A1 | 3/2009 | Starck |
| 2012/0315196 A1 | 12/2012 | Maus et al. |
| 2013/0025269 A1 | 1/2013 | Hodgson et al. |
| 2013/0340409 A1 | 12/2013 | Hodgson et al. |

FOREIGN PATENT DOCUMENTS

| | | |
|---|---|---|
| DE | 10 2005 046 029 | 3/2007 |
| DE | 10 2008 005 196 | 7/2009 |
| DE | 10 2009 047 647 | 6/2011 |
| DE | 10 2010 020200 A1 | 11/2011 |
| DE | 10 2010 024022 A1 | 12/2011 |
| DE | 10 2011 012441 A1 | 8/2012 |
| JP | S61-237919 | 10/1986 |
| JP | 2013-517411 | 5/2013 |
| JP | 2013-524086 | 6/2013 |
| WO | WO 2011/124637 | 10/2011 |
| WO | WO 2011157602 A1 * | 12/2011 ........... F01N 3/2066 |
| WO | WO 2012/113669 | 8/2012 |
| WO | WO 2012/152498 A1 | 11/2012 |

* cited by examiner

METHOD FOR PRODUCING A DELIVERY MODULE FOR INSTALLATION INTO A TANK

CROSS-REFERENCE TO RELATED APPLICATIONS

This is a U.S. national stage of application No. PCT/EP2014/065006, filed on 14 Jul. 2014, which claims priority to the German Application No. 10 2013 108 501.6 filed 7 Aug. 2013, the content of both incorporated herein by reference.

BACKGROUND OF THE INVENTION

1. Field of the Invention

The invention relates to a method for producing a delivery module having an electric PTC heater, which delivery module can be installed into a tank. The delivery module is suitable, in particular, for tanks, in which a liquid additive (in particular, urea/water solution) is stored.

2. Related Art

Exhaust gas treatment apparatuses are known, into which a liquid additive is fed for exhaust gas purification. In exhaust gas treatment apparatuses of this type, for example, the method of selective catalytic reduction (SCR method) is carried out. In this method, nitrogen oxide compounds in the exhaust gas of an internal combustion engine are removed with the aid of a reducing agent. In particular, ammonia is used as reducing agent. Ammonia is normally not directly stored in motor vehicles, but rather in the form of a liquid additive which can be converted to form ammonia within the exhaust gas (in the exhaust gas treatment apparatus) and/or outside the exhaust gas (in a reactor which is provided specially for this purpose). A liquid additive which is used particularly frequently for the exhaust gas purification is urea/water solution. A urea/water solution having a urea content of 32.5% is available under the commercial name AdBlue®.

During the design of delivery modules and tanks for providing, in particular, aqueous additives, it is to be taken into consideration that they can freeze at low temperatures. For example, a urea/water solution freezes at approximately −11° C. In the automotive sector, low temperatures of this type can occur, in particular, during long standstill phases of the motor vehicle in winter. This is a problem, in particular, during restarting of the delivery module. There is regularly the requirement that liquid additive is to be available immediately during starting of the motor vehicle. For this reason, it is known to provide an (active) heating system on/in a tank for storing the liquid additive or on/in the delivery module. Electric heaters, heaters which are operated with heated cooling liquid of an internal combustion engine and/or heaters which utilize the heat of the exhaust gases of an internal combustion engine (exhaust gas heat) have been proposed for this purpose.

Electric heaters have the advantage that they can already provide a great quantity of heating energy even very briefly after the operating start of a motor vehicle. In contrast, heated cooling liquid and exhaust gas heat are available only after a relatively long operating phase of an internal combustion engine. Electrical energy has to be capable of being provided, however, in a sufficient quantity by an energy store (for example, a rechargeable battery or a capacitor). The possibility of providing electrical energy in a motor vehicle is limited firstly with regard to the overall available quantity of energy. For example, only a defined energy quantity (for example, 1 or 2 MJ) can be made available overall for heating. Moreover, a limit typically exists with regard to the electrical power which can be demanded. This limit results from the capabilities of the energy store and/or the electric connecting lines from the energy store to the heater.

During the design of heating systems of this type for tanks and/or delivery modules for providing liquid additives, it is to be taken into consideration, moreover, that the liquid additive can be influenced chemically by way of excessive heating. The urea/water solution is converted chemically, for example, to form ammonia or undesired intermediate products if a limit temperature is exceeded. This should not occur in the delivery module and tank because the ammonia might corrode and damage components of the delivery unit. Therefore, heaters which are automatically deactivated when a maximum temperature is exceeded are particularly advantageous. Electric PTC heating elements (PTC=positive temperature coefficient) are known, for example. They are electric heating elements which exhibit a particular dependence of the electrical resistance on the temperature. In various PTC heating elements, there is in each case a characteristic and/or material-specific switching temperature, at which the electrical resistance is increased suddenly. Therefore, the heating current through a PTC heating element is reduced when the switching temperature is reached, and it is prevented that the temperature rises significantly above the switching temperature. A material which has the described PTC properties and of which most PTC heating elements consist is, for example, barium titanate ($BaTiO_3$). It is to be noted, however, that the available great number of different PTC materials which can be used here also have different prices.

SUMMARY OF THE INVENTION

Proceeding herefrom, it is an object of the present invention to solve or at least alleviate the described technical problems. In particular, a method for producing a delivery module having an electric PTC heater and a correspondingly produced delivery module are to be specified, which make particularly advantageous operation of the heating system possible with as little power loss as possible and as homogeneous a heating performance as possible.

The features which are described individually can be combined with one another in any desired technologically appropriate way and can be supplemented in greater detail by explanatory facts from the description, in particular also from the description of the figures.

According to one aspect of the invention a method is provided for producing a delivery module having an electric PTC heater, for installation into a tank for storing a liquid additive, having at least the following steps:

a) fixing of a maximum electrical power which is made available to the delivery module, b) determining of a thermal conductivity of the delivery module from a location of the electric PTC heater into the tank, c) calculating of a switching temperature of the PTC heater from the maximum electrical power and the thermal conductivity, and d) mounting a PTC material with a corresponding switching temperature for the PTC heater at the location.

The delivery module preferably has a housing, in which (active or controllable) components for delivering the liquid additive are situated, and which can be inserted into an opening in the bottom of a tank. The components for delivering the liquid additive comprise, in particular, a pump, by way of which delivery of the liquid additive and possibly also metering of the liquid additive can take place. A line for the liquid additive preferably runs through the delivery module. The pump is arranged on/in the line. The liquid additive is removed from the tank by the pump at an intake point and is provided to a supply connector of the delivery module.

The construction of the delivery module is not to be defined in all details here because a person skilled in the art can perform numerous adaptations here in accordance with the construction of the tank and/or the delivery performance of the delivery module. Nevertheless, two special design variants of a delivery module which can be produced by way of the described method will be presented later by way of example.

The maximum electrical power ($W_{max}$) which is fixed in step a) can be defined, for example, by way of the cross section of an electric supply line, via which the delivery module is supplied with electrical energy. An available supply voltage in a motor vehicle lies, for example, at 12 V, at 24 V or even at 48 V. Depending on the cross section of the electric supply line, a maximum electrical power which can be transmitted via the supply line results from the available supply voltage. It is also possible that the maximum electrical power is fixed by way of a stipulation of the motor vehicle manufacturer. The maximum electrical power can also be fixed by virtue of the fact that a current supply in a motor vehicle (for example, a rechargeable battery and/or a generator of the motor vehicle) can make available only limited electrical power. Moreover, in addition to the delivery module for the liquid additive, a motor vehicle regularly has further electrical consumers which possibly limit the available maximum electrical power for the heating at the time of the starting of the delivery module and/or its heating.

The method is particularly advantageous if the maximum electrical power for step a) is fixed to a value between 100 W and 200 W, in particular to a value between 110 W and 130 W and very particularly preferably to (approximately) 120 W. In this context, a maximum electrical power is to be considered which is made available to the delivery unit during the operation of the delivery unit permanently, that is to say at least for a predefined time interval of, for example, at least 5 minutes or even at least 10 minutes, and is demanded by the delivery unit. Electrical power which the delivery unit demands immediately after switching on of the electric PTC heater for very short time intervals is not included. When the electric PTC heater is switched on, brief switch-on currents (peak currents) can occur which can cause the delivery unit to demand electric power of more than 250 W, in particular even more than 350 W for very short time intervals of, for example, less than 2 minutes or even less than 1 minute. In particular, peaks of this type are not taken into consideration here.

The electrical power can usually be made available in a motor vehicle for a delivery module for liquid additive, without an impairment of the operation of the other components of the motor vehicle occurring.

In step b), a thermal conductivity of the delivery module from a location of the electric PTC heater into the tank is determined. The (defined) location also ultimately specifies the (actual or later) position within the delivery module, at which the electric PTC heater is mounted. The thermal conductivity is usually defined as a quotient of the power and the temperature (W/kelvin). The thermal conductivity specifies how much heat energy is transmitted from the location of the heater into the tank if there is a temperature difference of 1 kelvin between the location of the heater and the tank. If the temperature difference between the location of the heater and the tank rises, the transmitted heat quantity also rises proportionally. The thermal conductivity is dependent on the construction (material, arrangement, etc.) of the delivery module. In particular, the spacing of the location from the interior space of the tank and the materials used between the location and the interior space of the tank (in particular, the material of the housing of the delivery module) are relevant for the thermal conductivity. For a person skilled in this art, it is generally unproblematic (possibly with the use of usual calculation aids) to determine the quantity of the corresponding thermal conductivity toward the tank interior, proceeding from a specific construction of the delivery module and the desired location of mounting for the heater.

The method is particularly advantageous if the thermal conductivity in step b) is determined by way of a finite element simulation of the delivery module.

In a finite element simulation (FEM simulation), the thermal behavior of the materials of the delivery module and, in particular, of the material of the housing of the delivery module and of all modules and components within the housing of the delivery module which are situated between the location of the heater and the tank or the interior space of the tank can be simulated. In the finite element simulation, a model of the delivery module is used, the thermal conductivities of the housing and the modules and components being stored (individually). The thermal conductivity from the location into the tank overall can thus be calculated.

The finite element simulation can be carried out by way of a simplified two-dimensional model of the construction of the delivery module. A two-dimensional model can consist, for example, of a cross section through the delivery module. A two-dimensional model is appropriate when the delivery module is of at least approximately symmetrical construction because only then do the values for the thermal conductivity which are determined on a two-dimensional model make a realistic estimation of the actual thermal conductivity in the third dimension possible. It is particularly preferred therefore that a three-dimensional finite element simulation is carried out, in which the model which is used for the finite element simulation corresponds to the actual construction of the delivery module and three-dimensional features are also taken into consideration which differ from a (possibly symmetrical) basic shape of the delivery module. In the case of a delivery module with a circular or cylindrical basic shape, features of this type which differ from the basic shape can be, for example, indentations and/or bulges for a filling level sensor. A round or circular delivery module could also be simulated two-dimensionally in a simple way per se without features of this type.

Furthermore, the method is advantageous if the thermal conductivity ($\alpha_{module}$) in step b) is determined by way of an experiment, in which a first temperature is fixed in the tank at the PTC heater and a second temperature is fixed in the tank, and a heat quantity is determined which flows from the PTC heater into the tank, the thermal conductivity being calculated from the difference of the first temperature and the second temperature and the heat quantity.

This is an experimental approach for determining the thermal conductivity in step b). The fixing of the first temperature and the second temperature can take place, for example, by virtue of the fact that in each case one heat exchanger is arranged on a surface of the delivery module which is connected to the tank and at the location of the PTC heater, which heat exchanger sets a defined temperature and holds said temperature independently of the heat quantity which is fed or discharged via the respective heat exchanger, in order to maintain the temperature. A heat exchanger of this type can be, for example, a liquid heat exchanger, through which a great quantity of liquid flows which has exactly the first temperature or the second temperature.

The heat quantity which flowing between the location of the PTC heater and the tank on account of the difference between the first temperature and the second temperature can be determined by way of sensors on the delivery module. It is possible here that a plurality of temperature sensors are positioned in the surrounding area, which temperature sensors make as accurate a determination as possible of the temperature field or temperature averaging possible. It is also possible, however, that the heat quantity is determined by way of an energy balance at the respective heat exchangers. The quantity of heat which is fed in or discharged at the first heat exchanger and the quantity of heat which is discharged or fed in at the second heat exchanger correspond in each case to the heat quantity which is transmitted from the location of the PTC heater into the tank or vice versa. This applies, however, only if no heat loss occurs. During the calculation of the thermal conductivity, heat losses can optionally be taken into consideration by way of a comparison of the heat quantity which is fed in or discharged at the first heat exchanger and the heat quantity which is discharged or fed in at the second heat exchanger.

An experimental approach of this type for determining the thermal conductivity is advantageous because no complicated FEM model has to be generated, in order to calculate the thermal conductivity. Moreover, it is possible by way of this approach, even in the case of particularly complex designs of a delivery module, to determine the actual thermal conductivity relatively exactly.

In step c), a switching temperature ($T_{switch}$) of the PTC heater is calculated from the maximum electrical power and the thermal conductivity. The calculation can take place, for example, using a mathematical formula which represents the relationship between the switching temperature, the electrical power and the thermal conductivity. The method is particularly advantageous if, in step c), a maximum temperature ($T_{max,\ UWS}$) which may occur in the tank without the liquid additive changing chemically is taken into consideration.

The maximum temperature preferably lies between 50° C. and 90° C. [degrees Celsius], preferably between 70° C. and 80° C. Taking the maximum temperature into consideration in step c) can prevent the liquid additive in the tank being converted chemically as a result of the use of the PTC heater.

Moreover, it is advantageous if, in step c), a minimum temperature ($T_{min,\ UWS}$) which can occur in the tank is assumed, the minimum temperature being less than or equal to −11° C. The maximum possible temperature difference between the location of the PTC heater or the PTC heater and the tank usually depends on the minimum temperature. The minimum temperature can be fixed, for example, by the lowest temperature which may occur in the surrounding area of a motor vehicle and/or to which the liquid additive in the tank may be cooled theoretically if it is frozen. The minimum temperature can be fixed differently from region to region, for example can be substantially lower in northern countries such as Sweden or Norway than in southern countries such as Spain or Italy. The minimum temperature lies, for example, between −20° C. and −50° C.

The minimum temperature can be used as a lower limit temperature of an operating range of the PTC element.

It is preferred that, in step d), at least one PTC material on the basis of barium titanate is mounted. Barium titanate ($BaTiO_3$) is a mixed oxide of barium and titanium. At approximately 120° C., a phase change of the barium titanate takes place which leads to a sudden increase in the electrical resistance. This effect can be utilized as switching temperature. The desired switching temperature of the PTC material can possibly be adapted even more precisely to the switching temperature calculated in step c) by way of various material additions. PTC material on the basis of barium titanate can be provided as a mixture of barium carbonate and titanium oxide. A pulverulent mixture of barium carbonate and titanium oxide is usually sintered at high temperatures. The barium titanate is produced in the process. Material additives can be added to the pulverulent mixture. The electrical properties and, in particular, the switching temperature of the PTC material can be set by way of the ratio of barium carbonate and titanium oxide in the pulverulent mixture and the additional material additives.

In step d), a PTC material is preferably mounted which has a substantially constant electrical resistance in the range between the switching temperature and a lower limit temperature. The electrical resistance of the PTC material preferably changes in a working temperature range between the lower limit temperature and the switching temperature by less than 30%, preferably even by less than 20% and particularly preferably by less than 10%. This makes it possible that the heating power which is absorbed by the PTC element is substantially constant in the entire working temperature range, without additional measures for influencing the heating power being necessary. For example, an additional control resistor for controlling the PTC heater can be dispensed with.

It is also noted that possibly a plurality of PTC heaters are mounted at a plurality of (defined) locations, PTC heaters which are adapted in each case accordingly with regard to their switching temperature then being provided. Accordingly, the plurality of PTC heaters can have identical and/or different switching temperatures, in particular with the aim of heating the (frozen) additive situated in the tank as quickly as possible.

Furthermore, a delivery module for installation into a tank is specified, which delivery module has been produced in accordance with a described method, the delivery module having a housing which can be inserted into the bottom of the tank, and the housing separating a first interior space of the delivery module from a second interior space of the tank, and the electric PTC heater being arranged in the first interior space of the delivery module, and the switching temperature of the electric PTC heater lying between 80° C. and 150° C.

The delivery module is particularly advantageous if it has a heat distribution structure which is arranged in the first interior space of the housing and is set up to transmit heat from the PTC heater to the housing.

The housing of a delivery module of this type is preferably (predominantly) formed by plastic. The heat distribution structure can be manufactured, for example, from aluminum. The thermal conductivity from the PTC heater into the tank then depends significantly on the housing and, in particular, on the shape of the housing, the (wall) thickness of the housing and the material of the housing. In particular, a homogeneous and/or targeted distribution of the heat within the first interior space of the housing is achieved by way of the heat distribution structure.

In a further design variant of the delivery module for installation in a tank, which delivery module has been produced in accordance with a described method, a housing is provided which can be inserted into the bottom of a tank, the electric PTC heater being arranged in a hood which surrounds the housing, and the switching temperature of the PTC heater lying between 50° C. and 90° C., preferably between 70° C. and 80° C. In particular, the switching temperature is selected in such a way that a fixed maximum temperature between 50° C. and 90° C., in particular between 70° C. and 80° C., prevails on the outside on the hood.

A hood of this type is, in particular, bell-shaped. The hood surrounds the housing only in the regions, in which the housing is in contact with a second interior space of the tank. The hood is preferably (predominantly) made from a plastic material. The location of the PTC heater is preferably in/on the hood. The at least one PTC heating element can be cast and/or injection molded into the hood. It is also possible that heat distribution structures are provided in the hood, which heat distribution structures have a very satisfactory thermal conductivity and are in contact with the location of the PTC heater, in order to distribute the heat of the PTC heater in the bell hood.

The special advantages and design features shown for the described method can be applied and transferred in an analogous way to the different described delivery modules. The same applies to the special advantages and design features which are shown in conjunction with the delivery modules and can likewise be applied and transferred in an analogous way to the method.

Furthermore, a motor vehicle is proposed, having an internal combustion engine and an exhaust gas treatment apparatus for purifying the exhaust gases of the internal combustion engine, a tank for storing a liquid additive, and a described delivery module which is set up to feed the liquid additive from the tank to the exhaust gas treatment apparatus. An SCR catalytic converter, on which nitrogen oxide compounds in the exhaust gases of the internal combustion engine are converted/reduced, is preferably arranged in the exhaust gas treatment apparatus.

BRIEF DESCRIPTION OF THE DRAWINGS

In the following text, the invention and the technical background will be explained in greater detail using the figures. It is to be noted that the figures and, in particular, the proportions shown in the figures are merely diagrammatic. In the figures.

DETAILED DESCRIPTION OF THE PRESENTLY PREFERRED EMBODIMENTS

Figure 1:
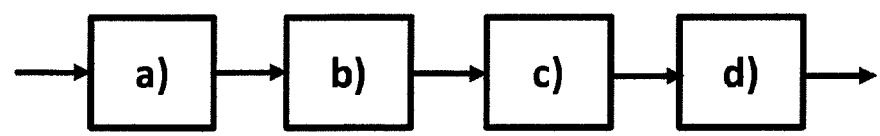
FIG. 1 shows a flow chart of the described method.

The above-described method steps a) to d) of the described method which take place during the production of a delivery module can be seen in the flow chart according to FIG. 1.

Figure 2:
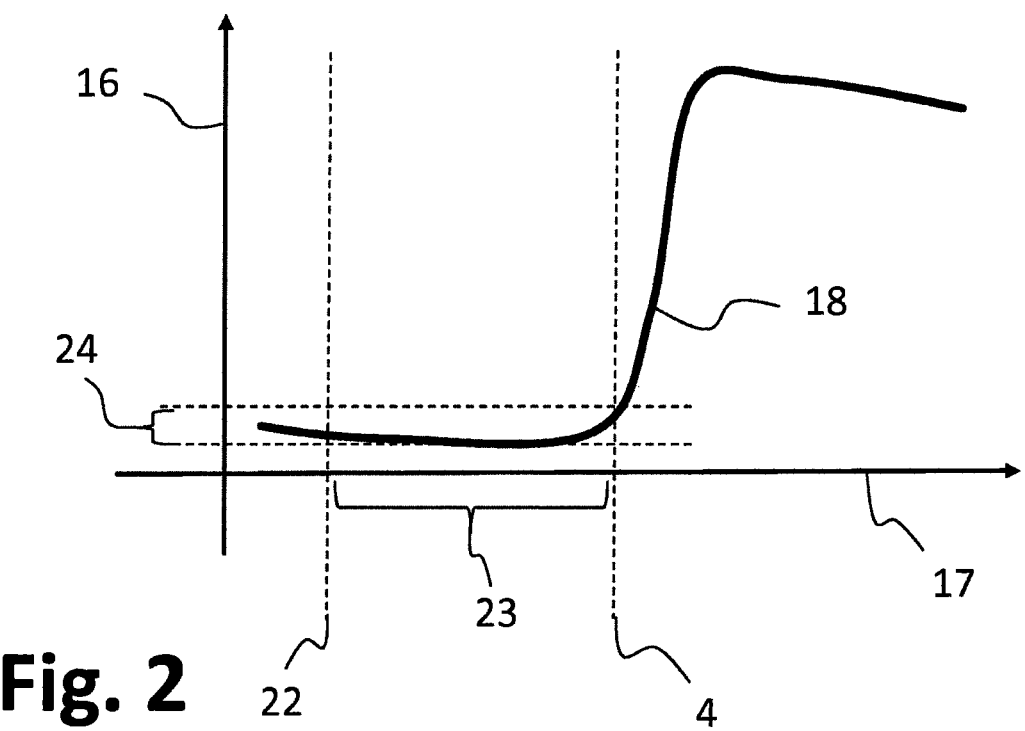
FIG. 2 shows a characteristic curve of a PTC heater.

FIG. 2 shows a PTC curve 18, plotted in a diagram on a resistance axis 16 against the temperature axis 17. It can be seen in the PTC curve 18 that the electrical resistance which is plotted on the resistance axis 16 is relatively low at low temperatures. At a switching temperature 4, the electrical resistance according to the PTC curve 18 rises abruptly to a high value. Therefore, the electrical current which flows through a PTC heating element drops abruptly after the switching temperature 4 is reached. A lower limit temperature 22 for the operation of a delivery module can also be seen. A working temperature range 23 lies between the lower limit temperature 22 and the switching temperature 4. Temperatures lying within the working temperature range 23 can occur during the operation of the PTC element. Within the working temperature range 23, at most a resistance change 24 which is less than 30%, preferably less than 20% and particularly preferably less than 10% occurs in a manner dependent on the temperature.

Figure 3:
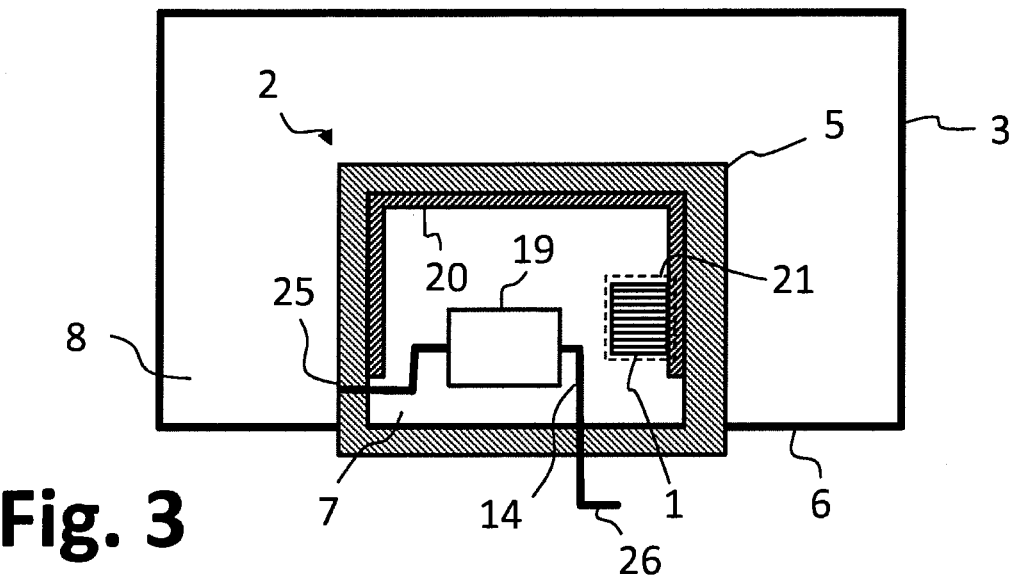
FIG. 3 shows a first design variant of a described delivery module in a tank.
Figure 4:
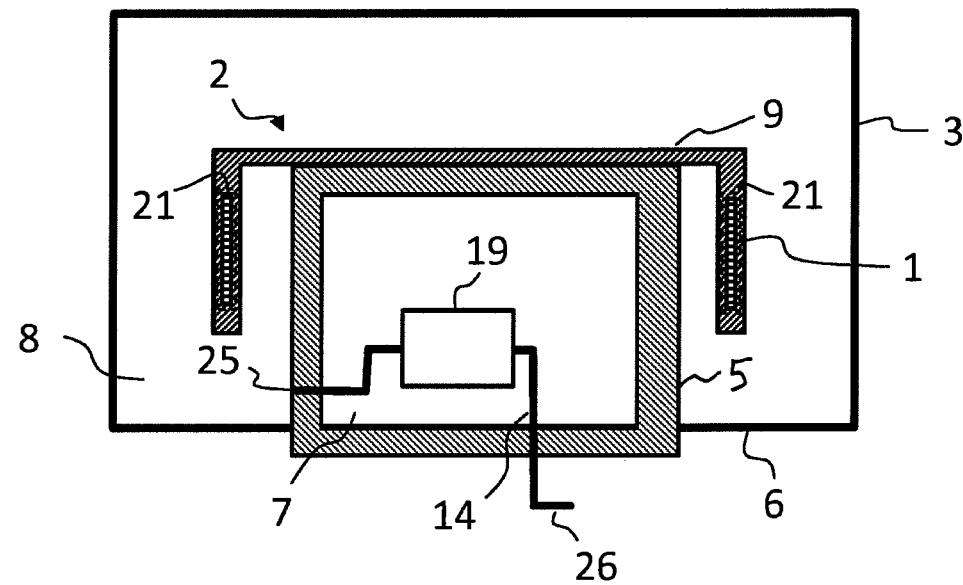
FIG. 4 shows a second design variant of a described delivery module in a tank.

FIGS. 3 and 4 in each case depict a tank 3, into which a delivery module 2 is inserted. The delivery module 2 comprises in each case one housing 5, in which components for delivering the liquid additive are arranged, in particular a pump 19. The pump 19 removes liquid additive from the tank 3 via the line 14 at an intake point 25 and provides the liquid additive via the line 14 again (at an increased pressure) at a supply connector 26.

In the design variant according to FIG. 3, the PTC heater 1 is arranged at a location 21 in a first interior space 7 of the housing 5. The PTC heater 1 is also combined with a heat distribution structure 20 here. The heat distribution structure 20 distributes the heat generated by the PTC heater 1 in the housing 5 and, in particular, on the wall of the housing 5. The heat can pass from the first interior space 7 of the housing 5 through the housing 5 into the second interior space 8 of the tank 3.

In the design variant according to FIG. 4, a hood 9 which surrounds the housing 5 partially is arranged on the delivery module 2. In particular, that side of the housing 5 which faces the interior space 8 of the tank 3 is surrounded, or closed, by the hood 9. At least one PTC heater 1 is integrated into the hood 9 at at least one location 21. The heat which is produced by the PTC heater 1 merely has to be transported through the material of the hood 9, in order to pass into the second interior space 8 of the tank.

Figure 5:
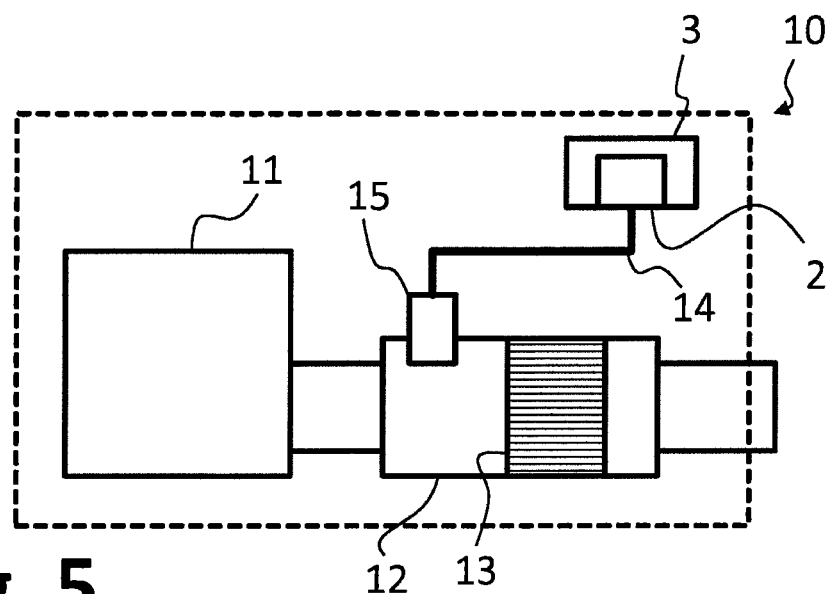
FIG. 5 shows a motor vehicle, having a described delivery module.

FIG. 5 schematically shows a motor vehicle 10, having an internal combustion engine 11 and an exhaust gas treatment apparatus 12 for purifying the exhaust gases of the internal combustion engine 11. An SCR catalytic converter 13 which is supplied with liquid additive for exhaust gas purification by an addition apparatus 15 is arranged in the exhaust gas treatment apparatus 12. The addition apparatus 15 obtains the liquid additive (urea/water solution) by the delivery module 2 from a tank 3, the liquid additive being conveyed out of the tank 3 and being provided to the addition apparatus 15 via a line 14.

As a precaution, it is also to be noted that the combinations of technical features which are shown in the figures are not generally compulsory. Thus, technical features of one figure can be combined with other technical features of a further figure and/or of the general description. Something different is to apply here only if the combination of features has been disclosed explicitly here and/or a person skilled in the art recognizes that otherwise the basic functions of the apparatus and/or of the method can no longer be fulfilled.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

LIST OF DESIGNATIONS

1 PTC heater
2 Delivery module
3 Tank
4 Switching temperature
5 Housing
6 Bottom
7 First interior space
8 Second interior space
9 Hood
10 Motor vehicle
11 Internal combustion engine
12 Exhaust gas treatment apparatus
13 SCR catalytic converter
14 Line
15 Addition apparatus
16 Resistance axis
17 Temperature axis
18 PTC curve
19 Pump
20 Heat distribution structure
21 Location
22 Lower limit temperature
23 Working temperature range
24 Resistance change
25 Intake point
26 Supply connector

The invention claimed is:

1. A method for producing a delivery module (2) having an electric positive temperature coefficient (PTC) heater (1), for installation into a tank (3) for storing a liquid additive, the method comprising:
   a) setting a maximum electrical power that is made available to the delivery module (2);
   b) determining a thermal conductivity of the delivery module (2) from a location (21) of the electric PTC heater (1) toward an interior space of the tank (3);
   c) calculating a switching temperature (4) of the PTC heater (1) based on the set maximum electrical power and the determined thermal conductivity; and
   d) mounting, at the location (21) in the tank, a PTC material with the calculated switching temperature (4) for the PTC heater (1),
   wherein the determined thermal conductivity is determined, in step b), by:
   an experiment, in which a first temperature is set in the tank (3) and a second temperature is set in the tank (3) at the location (21) of the PTC heater (1), and a heat quantity that flows from the PTC heater (1) into the interior space of the tank (3) is determined, the thermal conductivity being calculated from the difference between the first temperature and the second temperature and from the heat quantity.

2. The method as claimed in claim 1, wherein the set maximum electrical power is a value between 100 W and 200 W.

3. The method as claimed in claim 1, wherein a maximum temperature that may occur in the tank (3) without the liquid additive changing chemically is taken into account in the calculation of step c).

4. The method as claimed in claim 1, wherein the PTC material comprises barium titanate.

5. A delivery module (2) for installation into a tank (3), the delivery module produced by the method as claimed in claim 1, wherein:
   the delivery module (2) has a housing (5) insertable into a bottom (6) of the tank (3), the housing (5) separating a first interior space (7) of the delivery module (2) from a second interior space (8) of the tank (3), and the electric PTC heater (1) being arranged in the first interior space (7) of the delivery module (2), and the switching temperature (4) of the electric PTC heater lying between 80° C. and 150° C.

6. The delivery module (2) as claimed in claim 5, the delivery module (2) having a heat distribution structure (20) arranged in the first interior space (7) of the housing (5) and configured to transmit heat from the PTC heater (1) to the housing (5).

7. A delivery module (2) for installation into a tank (3), the delivery module (2) produced by the method as claimed in claim 1, the delivery module (2) having a housing (5) insertable into a bottom (6) of the tank (3), the electric PTC heater (1) being arranged in a hood (9) which surrounds the housing (5), and the switching temperature (4) of the electric PTC heater lying between 50° C. and 90° C.

8. A motor vehicle (10) having an internal combustion engine (11), and an exhaust gas treatment apparatus (12) for purifying the exhaust gases of the internal combustion engine (11), a tank (3) for storing a liquid additive, and a delivery module (2) as claimed in claim 5, which is configured to feed the liquid additive from the tank (3) to the exhaust gas treatment apparatus (12).

* * * * *